Feb. 28, 1950  F. W. HARRIS  2,498,756
REAMER
Filed May 20, 1946
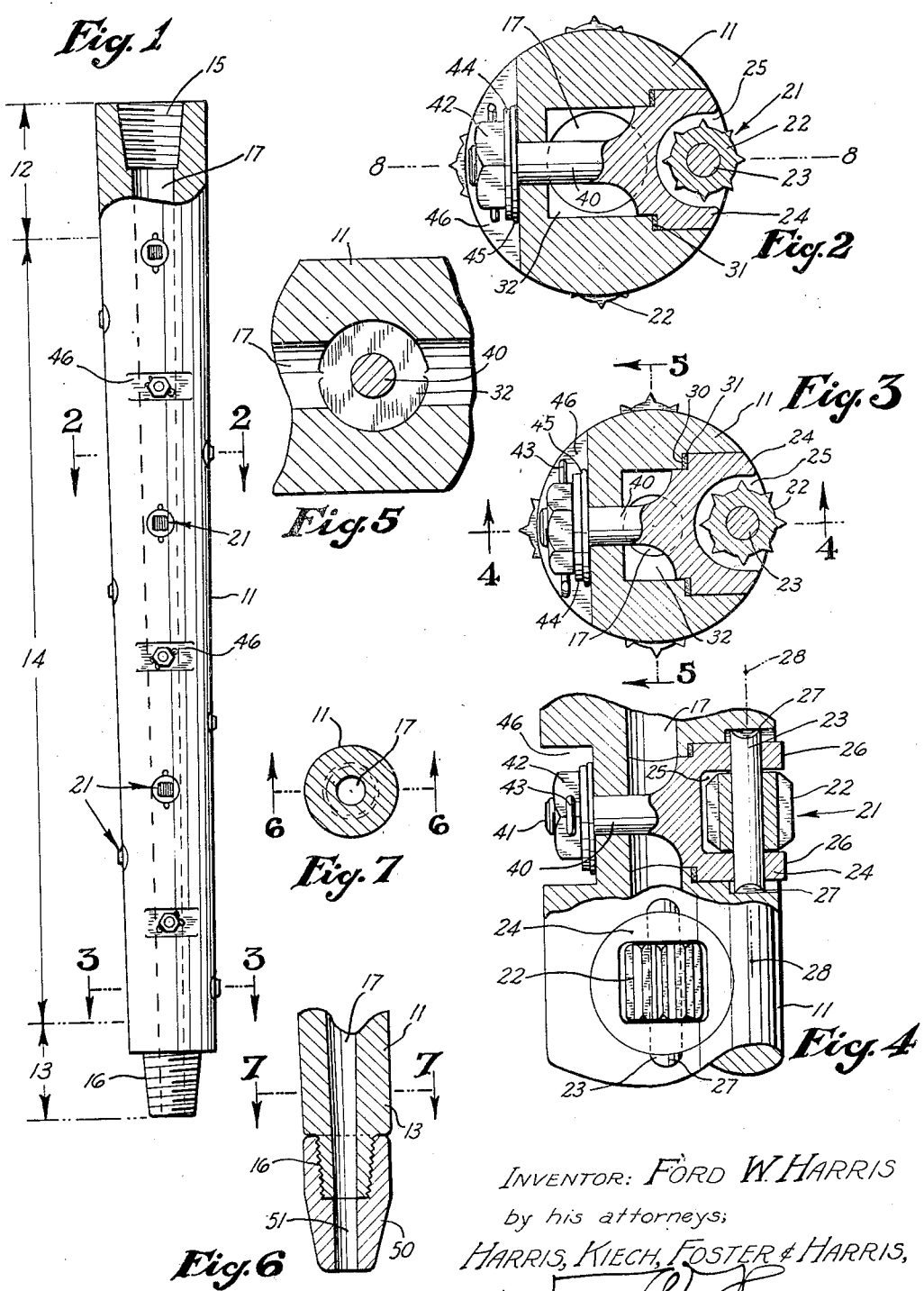
INVENTOR: FORD W. HARRIS
by his attorneys;
HARRIS, KIECH, FOSTER & HARRIS, Patented Feb. 28, 1950

2,498,756

UNITED STATES PATENT OFFICE 2,498,756

REAMER

Ford W. Harris, Los Angeles, Calif.

Application May 20, 1946, Serial No. 670,932

10 Claims. (Cl. 255—74)

My invention relates to the art of drilling wells and may be used to advantage in drilling oil wells by the now widely used rotary system, in which a bit carried on the lower end of, and rotated with and by, a drill pipe cuts the bottom of the well bore or "hole" and thus deepens the hole.

It is an object of my invention to provide a new and useful reamer well suited for use in an oil well, the word "reamer" being defined as a tool used to enlarge a cylindrical hole. My reamer may be used to enlarge, and to straighten to a uniform diameter, the rough hole produced in the rock formations of the earth through which oil wells are drilled.

The purposes, functions, and advantages of my invention will be made more evident hereinafter.

In the drawing, which illustrates a preferred form of my invention designed to be used in an oil well:

Fig. 1 is an elevation, partly in section, of my reamer;

Fig. 2 is a sectional view, on a scale somewhat larger than that used in Fig. 1, of the reamer shown in Fig. 1, this plane being defined by the line 2—2 of Fig. 1 and being viewed in that figure in the direction of the arrows adjacent the ends of the line 2—2;

Fig. 3 is a sectional view of the reamer shown in Fig. 1 on the same scale as that used in Fig. 2 on a plane defined by the line 3—3 of Fig. 1, this plane being viewed in the direction of the arrows adjacent the ends of the line 3—3;

Fig. 4 is a view, partly in section, of the reamer shown in Figs. 1, 2, and 3, the plane of this section being indicated by the line 4—4 of Fig. 3 and being viewed in the direction of the arrows adjacent the ends of the line 4—4;

Fig. 5 is a partial sectional view of the reamer shown in Fig. 1 on a plane indicated by the line 5—5 of Fig. 3, the plane being viewed in a direction indicated by the arrows adjacent the ends of the line 5—5;

Fig. 6 is a sectional view on a plane indicated by the line 6—6 of Fig. 7, this plane being viewed in the direction of the arrows adjacent the ends of the line 6—6, on the same scale as that of Fig. 1, of a tapered end piece which may be used on the reamer shown in Fig. 1; and Fig. 7 is a sectional view of the reamer shown in Fig. 1 on a plane indicated by the line 7—7 of Fig. 6, this plane being viewed in the direction of the arrows adjacent the line 7—7.

In the embodiment of my invention shown in the drawing, I provide a steel body 11 which has cylindrical ends of axial lengths represented by the dimension lines 12 and 13 of Fig. 1. The upper end of the reamer, that is, the end which is nearest the surface of the ground when the reamer is in the "hole" or bore of the well and whose axial length is indicated by the dimension line 12, is of larger diameter than the lower end, whose axial length is indicated by the dimension line 13, and this upper portion 12 and lower portion 13 of the reamer are connected by a frusto-conical portion whose length is indicated by the dimension line 14 of Fig. 1. The upper portion 12 has a threaded tool joint box 15 which is coaxial with the body 11 and which is provided so that the reamer may be secured to a drill pipe by means of a tool joint pin secured on the lower end of the drill pipe and threaded to fit in the box 15. The lower portion 13 of the reamer body 11 has a threaded tool joint pin 16 which is coaxial with the body 11, the pin being provided so that a drilling bit may be secured on and below the reamer, such bits having a tool joint box which is threaded to fit on the pin 16. Extending entirely through the body 11 is a mud passage 17, which may be frusto-conical so that it is of larger diameter in the portion 12 than it is in the portion 13 of the body 11. The only purpose of making the mud passage 17 frusto conical is to increase its average area over the value it would have if it had a uniform diameter equal to the maximum diameter permissible at the lower end of the body 11. In the larger types of reamers the mud passage may be of uniform diameter.

I do not show the drill pipe or drilling bit, as both are well known in the art in various common forms. It should be sufficient, in view of common knowledge as to oil well drilling, to say that the drill pipe is suspended and rotated in the hole by well known means and that it supports and rotates the body 11 of my reamer, that the bit secured to the lower end of the body 11 is rotated by and with the body 11, and that when the drill pipe is lowered sufficiently the bit contacts and cuts the bottom of the hole, thus deepening it. It is a distinguishing feature of the art of rotary drilling that mud is circulated during drilling, this mud being forced downwardly through the drill pipe, through the mud passage 17 in the body 11, and through the bit, this mud then flowing upwardly outside the body 11 and inside the hole to the surface of the ground. One of the major problems in the design of reamers intended to be used in oil wells is to get an adequately large and uninterrupted mud passage through the reamer, and such a passage 17 is provided in the reamer shown and described herein.

Reamers are used to cut away the vertical wall of the well as they are rotated therein, and in the reamer shown herein this cutting is done by cutter assemblies generally indicated by the numeral 21, these assemblies 21 being carried in the portion 14 of the body 11. Each of the cutter assemblies 21 carries a sharp-toothed cutter 22, the teeth of which project on one side of the cutter beyond the outer surface of the body 11 and thus contact the vertical wall of the well as the body 11 is rotated, the cutter turning on a pin 23 so that the teeth thereof successively come into contact with the wall. The use of similar teeth is old in the art, as they have been used both in reamers and in bits for many years. The form of teeth shown in the drawing is quite effective, but other old forms may be used to suit the various rock formations found in the walls of wells. Each of the pins 23 is carried in a cutter holder 24. The cutters 22 and pins 23 are the only parts of the reamer that wear away rapidly in use, because cutters and pins turn in the rotary mud, which is usually water carrying rock particles, clay, or the like in suspension, and the cutters and pins must be frequently replaced.

All surfaces of each of the cutter holders are symmetrical about the axis 8—8 except a cavity in the top thereof in which the pins 23 are supported as shown in Fig. 4 in bearings 26 forming an integral part of the cutter holders 24. The ends 27 of the pins are made semicircular about an axis intersecting and at right angles to the major axis 28 of the pins, this pin axis being defined by the line 28—28 of Fig. 4.

The rounded ends of the pins 23 project beyond the bearings 26 and fit in semicircular grooves whose axes are in the plane indicated by the line 8—8 of Fig. 2. Since the pins 23 project beyond the cutter assemblies 21 into the body 11, they prevent the cutter assemblies from turning in the body, and the rounded ends of the pins prevent them from turning in the bearings 26 so that there is no wear in these bearings. The cylindrical outer surface of the outer portion of each of the cutter holders fits in a cylindrical cavity in the body 11, and this cavity terminates at a packing surface 30 which is radial to the axis 8—8 of Fig. 2. Thin but slightly resilient sheet packing 31 is placed between the cutter holders 24 and the body 11 at this point to form a liquid-tight seal for a central cavity 32 which is in open communication with the central mud passage 17 of the body 11 and through which the mud flows. Formed on each of the cutter holders and coaxial with the axis 8—8 is a bolt 40 having a threaded outer end 41. Each of the bolts 40 passes through its respective cavity 32 and through the wall thereof and is threaded in a nut 42. Suitable locking means, such as a cotter pin 43, locks the nut 42 to the bolt 40. Each of the nuts 42 abuts against a washer 44 which compresses thin, slightly resilient, fibrous packing 45 against the body 11 and prevents mud from leaking out of the cavity 32. The nuts 42 are inside the outer surface of the body 11 due to being placed in grooves 46. Due to the packing 31 and 45, the cavity 32 will carry mud under considerable pressure, and since the packing 45 is compressed by tightening the nuts 42 on the bolts 40, the packing will stay tight over long periods. The nuts 42 also hold the cutter holders 24 firmly in place and at the same time allow the cutter assemblies to be easily taken out of the body 11 for replacement of the cutters 22 or pins 23, which can be done if the nuts 42 are unscrewed from the bolts 40.

The cutter assemblies are identical with each other except as to the length of the pins 23. The cylindrical recesses in the body 11 in which the cutter holders 24 are seated vary from each other so that each cutter assembly when seated therein is so positioned that only teeth of the cutters 22 project beyond the surface of the body. The cutter assemblies 21 are arranged spirally around the body 11, as shown in Fig. 1. In that figure twelve cutter assemblies are shown, but more or less such assemblies may be used. Two or more bodies may be used by coupling them together by pins 16 and boxes 15. This coupling together of parts by tool joints is a standard operation performed in every derrick by power-operated tongs provided for that purpose, the separate "stands" of drill pipe being so coupled and the bit now being secured thereon by these tongs.

The reamer may be used above the bit while drilling, or it may be used without a bit to ream a previously drilled hole. When used without a bit, a protector or nose 50 is screwed on the pin 16, this protector being shown in Figs. 6 and 7 and having a mud passage 51 through which mud is ejected into the hole. When used above a bit, the bit (not shown) is screwed on the pin 16.

The reamer may be very advantageously so used above the bit. Those portions of the bit that cut the periphery of the bottom of the hole are the first to wear, and, as they wear, the diameter of the hole steadily diminishes so that, instead of cutting a cylindrical opening, the bit cuts a conical one. My reamer placed above the bit corrects this condition, reaming the undersized hole to full gauge. The reamer also centers the bit coaxially with the reamed hole above so that a straight hole is produced. The reamer also cuts more evenly than any bit now in general use, as these bits tend to shirk hard spots, leaving them projecting into the well to later make trouble when it is desired to set additional casing. In some cases, bits cut a "corkscrew" hole, that is, a hole that is slightly rifled, or the hole curves slowly with the result that the bit wanders off the land from which the driller has the right to take oil.

The cutters 22 of my reamer cannot shirk the hard spots. Using only twelve cutter assemblies, each cutter has three cutters diametrically opposite to it which hold it to its work. When reaming through conglomerate or other formations known to have such hard spots, as many as three sections of reamers having in all thirty-six cutter assemblies may be used, in which case each cutter is backed by nine opposing cutters. In general, twelve cutters are enough, as the body 11 rotating about its axis has enough inertia to resist displacement from that axis by the momentary contact of the teeth of a cutter or the teeth of several cutters in vertical alignment with each other with a hard spot.

I recognize that it is not new to use cutters similar to those used by me to cut the vertical walls of a well, that is, to ream a well. My invention resides in the manner in which the cutters are placed and secured in the body in such a manner as to enable me to provide a very strong body, to very effectively secure the cutters in position, to enable me to leave an adequate area of mud channel through the reamer so that circulation of mud will not be too much impeded, to confine the wear to the pins and cutters, and to provide a construction such that these pins and cutters can be easily and quickly replaced by relatively unskilled labor at the point of use without the use of special tools or, indeed, any tools not now available on most oil well derrick floors.

I claim as my invention:

1. A reamer comprising: a body having a central mud passage and a cavity in open communication with said mud passage, the mud moving through said mud passage also moving through said cavity; a cutter holder closing one end of said cavity in fluid-tight relationship with the walls of said cavity; cutter means secured in said cutter holder and projecting from said body on one side thereof in position to engage and cut the vertical wall of a well in which said body is rotated; a bolt rigidly secured to said cutter holder and passing through said cavity without obstructing the flow of mud therethrough and through that portion of said body forming a wall for said cavity; packing means for preventing fluid from escaping from said cavity around said bolt; and means outside said body, on a side diametrically opposite to said cutter means, for engaging said bolt.

2. In a reamer, the combination of: a body; a cutter holder situated in a cylindrical cavity in said body, said holder being cylindrical about a major axis which intersects the major axis of the body at right angles thereto, said cutter holder being of sufficiently small diameter to slide freely into said cavity with its axis substantially coaxial with the axis of said cavity; a cutter carried in a cavity in one end of said cutter holder; and a bolt coaxial with said major axis of said cutter holder and extending from the other end of said cutter holder and outwardly through said body.

3. In a reamer, the combination of: a body; a cutter holder situated in a cylindrical cavity in said body, said cutter holder being cylindrical about a major axis which intersects the major axis of the body at right angles thereto; a cutter carried in a cavity in one end of said cutter holder; and a bolt coaxial with said major axis of said cutter holder and extending from the other end of said cutter holder through a central passage in said body through which mud passes and outwardly through said body.

4. In a reamer, the combination of: a body; a cutter holder situated in a cylindrical cavity in said body, said cutter holder being cylindrical about a major axis which intersects the major axis of the body at right angles thereto; a cutter carried in a cavity in one end of said cutter holder; a bolt coaxial with said major axis of said cutter holder and extending from the other end of said cutter holder through a central passage in said body through which mud passes and outwardly through said body; and means outside said body engaging the outer end of said bolt.

5. In a reamer, the combination of: a body; a cutter holder situated in a cylindrical cavity in said body, said holder being cylindrical about a major axis which intersects the major axis of the body at right angles thereto; a pin carried in said cutter holder and extending across a cavity in one end thereof; a toothed cutter mounted on said pin in said cavity and free to turn on said pin; and a bolt coaxial with said major axis of said cutter holder and extending from the other end of said cutter holder and outwardly through said body.

6. In a reamer, the combination of: a body; a cutter holder situated in a cylindrical cavity in said body, said cutter holder being cylindrical about a major axis which intersects the major axis of the body at right angles thereto; a pin carried in said cutter holder and extending across a cavity in one end thereof; a toothed cutter mounted on said pin in said cavity and free to turn on said pin; and a bolt coaxial with said major axis of said cutter holder and extending from the other end of said cutter holder through a central passage in said body through which mud passes and outwardly through said body.

7. In a reamer, the combination of: a body; a cutter holder situated in a cylindrical cavity in said body, said cutter holder being cylindrical about a major axis which intersects the major axis of the body at right angles thereto; a pin carried in said cutter holder and extending across a cavity in one end thereof; a toothed cutter mounted on said pin in said cavity and free to turn on said pin; a bolt coaxial with said major axis of said cutter holder and extending from the other end of said cutter holder through a central passage in said body through which mud passes and outwardly through said body; and means outside said body engaging the outer end of said bolt.

8. A cutter assembly consisting of: a cutter holder having a cylindrical periphery and having a cavity at one end thereof; a cutter having teeth on the periphery thereof, said cutter being situated in said cavity; a pin passing through said cutter holder and extending across said cavity, said cutter being mounted and free to turn on said pin, the ends of said pin extending outside said cutter holder to engage slots in the body in which said cutter holder is placed; a cylindrical bolt concentric with the axis of the cylindrical cutter holder; and fastening means on said bolt for holding the cutter holder in said body with the ends of the pin in said slot.

9. A cutter carrying member adapted to be carried in the body of a tool having a fluid carrying passage extending therethrough, said cutter carrying member comprising: a cutter holding body of cylindrical form and of sufficiently small diameter to be readily inserted in a cylindrical cavity in the body of the tool, said cavity being so placed that fluid flowing in said fluid carrying passage can also pass through said cavity; a cylindrical bolt having its inner end secured to said cutter holding body and its outer end projecting outside said body through a bolt opening in said body of said tool, the cylindrical outer surface being concentric with the axis of said cutter holding body, said bolt passing through said passage in said tool holder body but being of insufficient diameter to entirely block the flow of fluid through said passage; cutting means on the outer end of said cutter holding body; and fastening means outside said body so secured to the outer end of said bolt as to prevent said cutter holding body from being withdrawn from said body of said tool when the fastening means are so secured to the outer end of said bolt.

10. A cutter carrying member as claimed in claim 8 in which: packing means is provided so placed as to prevent fluid from passing outwardly through the space between the periphery of said cutter holding body and the inner wall of the cavity in which it is carried; and other packing means is provided so placed as to prevent fluid from passing outwardly through the space between the periphery of said bolt and the hole through which it passes.

FORD W. HARRIS.

REFERENCES CITED

The following references are of record in the file of this patent:

UNITED STATES PATENTS

| Number | Name | Date |
|---|---|---|
| 902,660 | Howarth | Nov. 3, 1908 |
| 1,042,761 | Brandenburg | Oct. 29, 1912 |
| 1,255,422 | Hughes | Feb. 5, 1918 |
| 1,330,656 | Ross | Feb. 10, 1920 |
| 1,359,699 | Hauser | Nov. 23, 1920 |
| 1,376,302 | Wooldridge | Apr. 26, 1921 |
| 1,681,651 | Woodruff | Aug. 21, 1928 |
| 1,705,055 | Allison | Mar. 12, 1929 |
| 1,801,424 | Gray | Apr. 21, 1931 |
| 1,893,693 | Aloi | Jan. 10, 1933 |
| 1,932,488 | Scott | Oct. 31, 1933 |
| 2,199,693 | Catland | May 7, 1940 |

FOREIGN PATENTS

| Number | Country | Date |
|---|---|---|
| 671,803 | France | Sept. 9, 1929 |